UNITED STATES PATENT OFFICE.

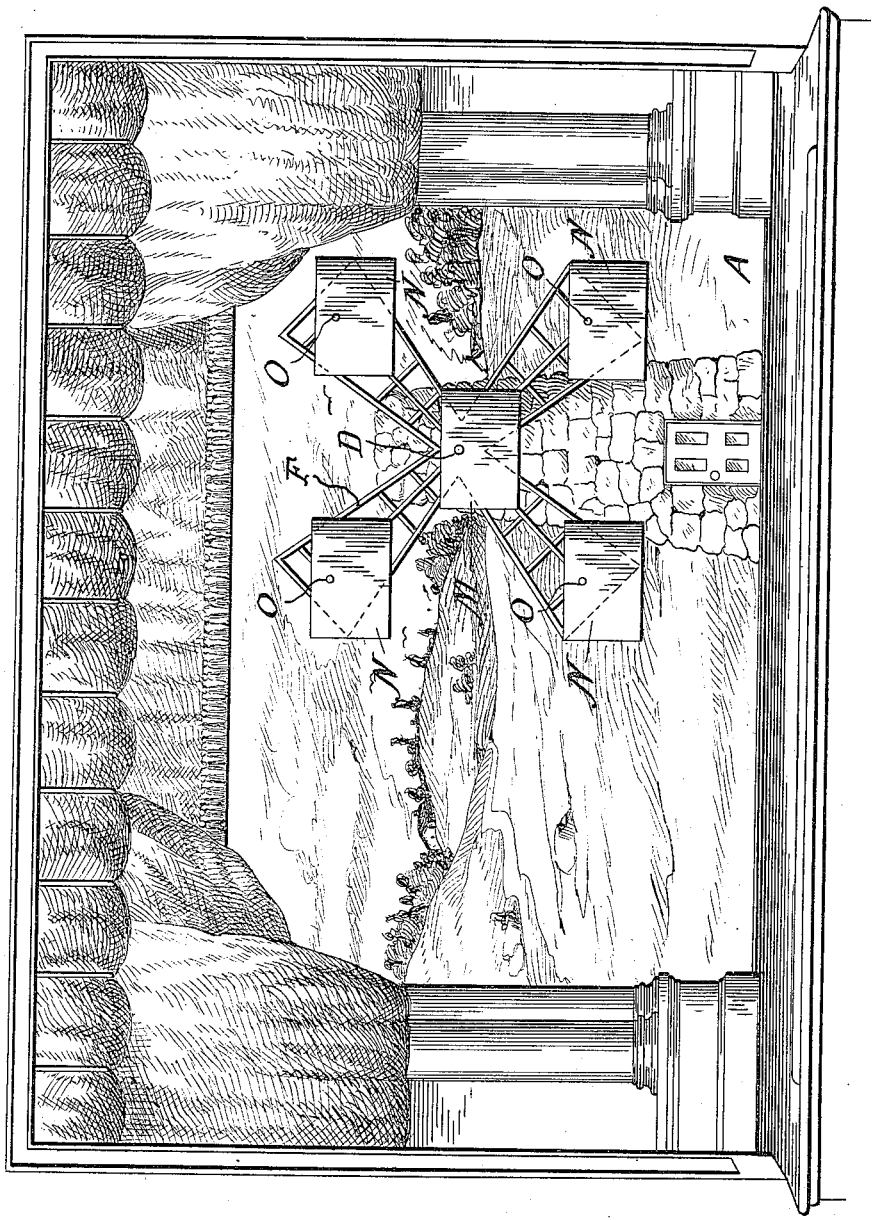

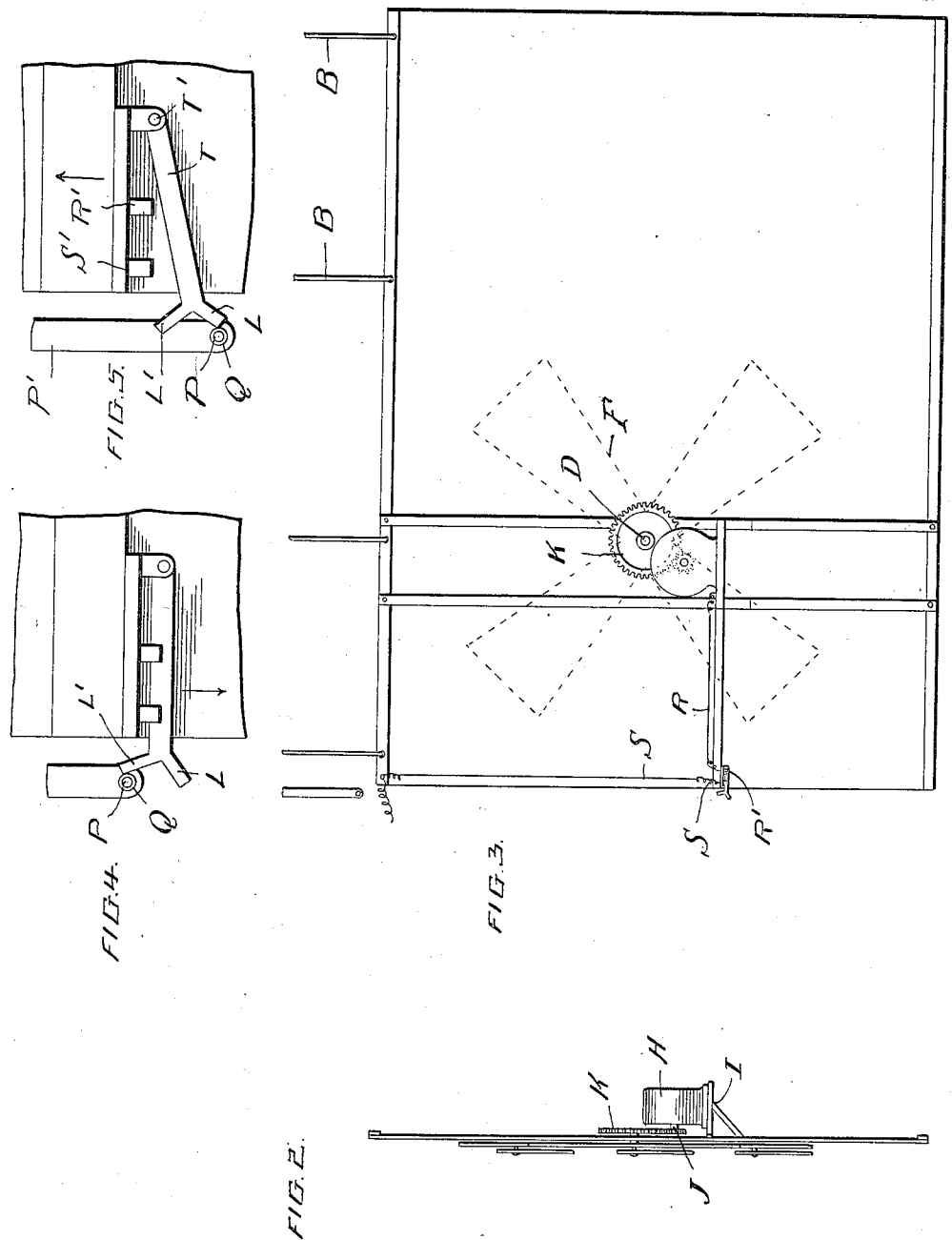

JOHN C. TAYLOR, OF BALTIMORE, MARYLAND.

ROTARY ADVERTISING ATTACHMENT FOR THEATRICAL CURTAINS.

1,045,637.  Specification of Letters Patent.  Patented Nov. 26, 1912.

Application filed February 1, 1912. Serial No. 674,634.

*To all whom it may concern:*

Be it known that I, JOHN C. TAYLOR, a citizen of the United States, residing at city of Baltimore, in the State of Maryland, have invented certain new and useful Improvements in Rotary Advertising Attachments for Theatrical Curtains; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in advertising devices adapted to be attached to theatrical curtains and comprises essentially a rotating object, such as a wind wheel, etc., upon which the advertising matter to be displayed is mounted and in the provision of motor apparatus for causing the movable object to rotate as the curtain is lowered.

The invention consists further in the provision, in connection with a motor-driven wind wheel, or other rotatable object adapted to be mounted for rotation upon a theatrical curtain, of a switch with a trip member for throwing the switch automatically to cause the circuit to be closed to start or stop the motor, accordingly as the curtain is lowered or raised.

The invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a front elevation showing the application of my invention to a theatrical curtain. Fig. 2 is an edge view of the curtain showing the motor and rotatable wind wheel mounted thereon. Fig. 3 is an enlarged detail in elevation of the rear of the curtain, showing the motor, switch and connections with the terminals thereof. Fig. 4 is an enlarged detail view of the switch throwing mechanism, showing the switch closed, and Fig. 5 is a view showing the switch open.

Reference now being had to the details of the drawings by letter, A designates a theatrical curtain which is adapted to be raised and lowered by any suitable mechanism, such as through the medium of the ropes or cables B, and mounted in suitable bearings in the curtain at any desired location is a shaft D carrying a wind wheel E, having the radial arms F. A motor H is mounted upon the shelf I upon the rear of the curtain and a gear wheel J is fixed to the motor shaft and meshes with a gear wheel K which is keyed to the shaft D. The relative sizes of said gear wheels are such that a proper rotary movement may be imparted to the wind wheel.

Pivotally mounted upon a pin O carried by each arm of the wind wheel is a sign N adapted to carry any advertising matter to be displayed to the audience when the curtain is lowered, each sign being swiveled so that it will be held right side up as the wind wheel rotates. Said shaft D also has loosely journaled thereon a sign M which, however, is stationary while the others move with the arms of the wheel.

The motor is driven by electrical energy conveyed through the wires R and S which are connected respectively to the terminals R′ and S′. A switch member T is pivotally mounted upon a pin T′, shown clearly in Figs. 4 and 5 of the drawings, and has one end forked, forming the fingers L and L′. A pin P is mounted upon a stationary object P′ and is provided with an anti-friction roller Q thereon and which is adapted to contact with one or the other of the fingers L and L′ as the curtain is raised or lowered.

In Fig. 4 of the drawings, the switch is shown in a closed relation, having been thrown to such position through the medium of the finger L′ having come in contact with the anti-friction roller Q upon the pin P as the curtain approaches its lowest position, while in Fig. 5 of the drawings the switch is thrown open by reason of the anti-friction roller having come in contact with the finger L as the curtain is raised.

While I have shown a rotatable wheel carrying advertising matter, it will be understood that I do not confine myself to a rotating member but rather to any movable object, either reciprocating or otherwise, upon which the advertising matter may be mounted. Neither do I limit the use of the invention to theatrical curtains, as it is obvious that the invention may be utilized upon buildings, sign boards, etc., upon which the object carrying the advertising matter may be given a movement of some kind for the purpose of attracting the attention of people.

By the provision of an advertising device as shown and described, it will be noted that the wind wheel or other movable object carrying the signs displaying advertising matter is caused to be given a rotary movement as the curtain is lowered by throwing the knife switch into contact with the terminals S' and R' and, upon the raising of the curtain, the switch will be thrown from contact with the terminals, stopping the motor and causing the wind wheel to cease its rotary movement.

What I claim to be new is:—

1. An advertising device for theatrical drop curtains comprising, in combination with a curtain, a movable advertising sign mounted thereon, motor-actuated mechanism for moving the sign, and means for automatically starting and stopping the motor, accordingly as the curtain is lowered or raised, as set forth.

2. A rotatable advertising device for theatrical drop curtains comprising, in combination with a curtain, a rotatable shaft mounted therein, a motor, gear connections between the same and said shaft, a wheel fixed to said shaft, advertising signs mounted upon the wheel, an electric circuit, a switch therein, and a fixed member against which the switch is adapted to contact as the curtain is lowered and raised, affording means for starting and stopping the motor, as set forth.

3. A rotatable advertising device for theatrical drop curtains comprising, in combination with a curtain, a rotatable shaft mounted therein, a motor, gear connections between the same and said shaft, a wind wheel fixed to the shaft, advertising signs pivotally mounted upon the arms of the wheel, terminals, electrical connections between one terminal and the motor the second terminal being connected with a source of supply, a pivotally mounted switch upon the curtain adapted to bridge said terminals and having a forked end, a stationary trip member against which the forked end of the switch is adapted to contact as the curtain is lowered and raised to close and open the switch, as set forth.

In testimony whereof I hereunto affix my signature in the presence of two witnesses.

JOHN C. TAYLOR.

Witnesses:
A. L. HOUGH,
A. R. FOWLER.